United States Patent [19]

Evans et al.

[11] Patent Number: 4,893,377
[45] Date of Patent: Jan. 16, 1990

[54] STUFFING HORN TURRET MACHINE

[75] Inventors: Alfred J. Evans; Raymond H. Misner, both of Raleigh; James A. Gallion, Cary; Melvin L. Harrod, Raleigh, all of N.C.

[73] Assignee: Delaware Capital Formation, Inc., Apex, N.C.

[21] Appl. No.: 285,325

[22] Filed: Dec. 13, 1988

Related U.S. Application Data

[63] Continuation of Ser. No. 144,589, Jan. 6, 1988, abandoned, which is a continuation of Ser. No. 947,628, Dec. 30, 1986, abandoned, which is a continuation-in-part of Ser. No. 821,691, Jan. 23, 1986, abandoned.

[51] Int. Cl.$^4$ ............................................. A22C 11/02
[52] U.S. Cl. ............................................. 17/35; 17/33; 17/41
[58] Field of Search .................. 17/35, 33, 34, 41, 42, 17/49, 1 F

[56] References Cited

U.S. PATENT DOCUMENTS

| 1,043,241 | 11/1912 | Lowden, Sr. | 17/41 |
| 3,964,236 | 6/1976 | Smith | 17/41 X |
| 4,142,273 | 3/1979 | Gay | 17/41 |
| 4,583,264 | 4/1986 | Nausedas | 17/41 |

Primary Examiner—Willis Little
Attorney, Agent, or Firm—Allegretti & Witcoff, Ltd.

[57] ABSTRACT

A stuffing horn turret machine has a stuffing horn receiving turret rotatably and translationally mounted on a frame. A rotary drive, a translational drive, limit position sensors, and a controller of logic elements cause the turret to rotate and translate the horns to and from active and standby positions. Cleaning and repair of the machine is facilitated by pivotable mounting of the machine, removable turret bearings, and many other important features.

7 Claims, 11 Drawing Sheets

STUFFING HORN TURRET MACHINE

This application is a continuation, divisional, of application Ser. No. 144,589, filed Jan. 6, 1988, now abandoned, which is a continuation, divisional, of application Ser. No. 947,628, filed Dec. 30, 1986 now abandoned, which is a continuation-in-part, of application Ser. No. 821,691, filed Jan. 23, 1986 now abandoned

BACKGROUND OF THE INVENTION

1. Field Of The Invention

This invention relates to an improved stuffing horn assembly for food processing equipment and more particularly to an improved stuffing horn assembly for use in combination with a sausage making machine.

2. Description Of The Prior Art

Use of a stuffing horn assembly in combination with a sausage making machine for facilitating manufacture of sausage is disclosed in various prior art patents including U.S. Pat. No. 4,023,238, Stuffing Machine with Telescoping Nozzle owned by Rheem Manufacturing Company, the assignee of the present application. U.S. Pat No. 4,023,238 is incorporated herewith by reference.

Previously, during manufacture of sausage, sheared casing material is applied over the end of a sausage stuffing horn. The end of the casing is sealed. Sausage material is then discharged through the horn into the casing material and the ends of the casing are clipped to form the completed sausage. U.S. Pat. No. 4,023,238 disclosed a sausage stuffing horn with the additional feature of a telescoping nozzle which may be adjusted to facilitate filling and sealing the ends of the casing in order to improve the quality of the final sausage product.

The apparatus disclosed in U.S. Pat. No. 4,023,238 works well in its intended environment. However, when the supply of sheared casing has been depleted from the end of a stuffing horn of the type shown in U.S. Pat. No. 4,023,238, various mechanisms must be removed or displaced in order to insert new sheared casing material over the end of the horn. This limits productivity of the equipment.

To overcome this disadvantage, sausage machines have been made which include a plurality of horns attached to a single platen. The platen may be rotated to align one of the horns with a sausage discharge outlet of a sausage machine. Simultaneously, sheared casing material is placed on the other horns. Upon depletion of casing from the horn associated with the sausage machine discharge, the platen is rotated to position a different horn with sheared casing material in front of the sausage machine discharge outlet.

The prior art platen device also operates well but does not include a telescoping horn assembly. Complexities associated with providing a horn of the type shown in U.S. Pat. No. 4,023,238 for each of the separate horns associated with the platen device apparently prevent successful and economic manufacture of such a device.

The invention of U.S. Pat. No. 4,142,273 provides a mechanism which incorporates the benefits of a sausage stuffing horn assembly having a plurality of separate stuffing horns while simultaneously incorporating the benefits associated with a telescoping horn assembly of the type shown in U.S. Pat. No. 4,023,238. U.S. Pat. No. 4,142,273 is incorporated herewith by reference. The structure of the invention of U.S. Pat. No. 4,142,273 permits improved control of indexing of the horns associated with the assembly while simultaneously providing improved control over the meat pump components of the sausage stuffing machine.

While the device of U.S. Pat. No. 4,142,273 works well, the sensing of the end of the casing material on a horn is manual, as is initiation of the indexing. An operator must supervise the process to assure casing is not allowed to end. A variety of other factors limit the desirability of the device including factors which restrict ability to clean and maintain the device. Such limitations are undesirable especially with a highly productive clipper such as that of U.S. Pat. Application Ser. No. 693,751 filed Jan. 23, 1985, and illustrated in FIGS. 1 and 2 of the accompanying drawings. U.S. Pat. Application Ser. No. 693,751 is incorporated herewith by reference.

SUMMARY OF THE INVENTION

An object of this invention is to provide a stuffing horn turret machine which is capable of high capacity, high speed operation; high product uniformity; versatility; reliability; ease of operation, maintenance and cleaning; efficiency; and a high level of safety.

A more specific object is to provide a device capable of automatic sensing of the ends of casings and of automatic response thereto, for continued high speed operation and minimal operator supervision.

Another object is to provide a device capable of facile, rapid tear down for cleaning and maintenance.

Still another object is to provide a device capable of use with a variety of clipper machines and pumping apparatus.

A further object is to provide a device which is efficient in use of energy and reduction of waste of casing and stuffing material due to both machine and operator error.

These and a number of other objects are accomplished by the invention. In a basic aspect, the invention is a turret machine for stuffing horns, the stuffing horns adapted to receive casings having ends, and the machine comprising a frame structure, a turret, drive means, limit means, control means and signal means. The turret is adapted to have mounted thereon at least two of the stuffing horns, and is rotatably mounted on the frame structure.

The drive means rotates the turret and thereby the stuffing horns through at least one active rotational position and at least one standby rotational position. The limit means is located on the turret assembly and senses movement of the end of a casing on a first of the stuffing horns while the first stuffing horn is in an active rotational position. The sensing means senses the proper presence or absence of a casing on the second stuffing horn while the second stuffing horn is in the standby rotational position. The signal means is a means for signaling a human operator.

The control means causes the drive means to rotate the first stuffing horn away from the active rotational position after the limit means senses movement of the end of the casing on the first stuffing horn. The control means also causes the drive means to (a) rotate the second stuffing horn to the active rotational position after the limit means senses movement of the end of the casing on the first stuffing horn, (b) rotate the second stuffing horn to the active rotational position only if the sensing means senses that a casing is properly present on the second stuffing horn. The control means is operatively connected to the signal means and further activates the signal means after the limit means senses movement of the end of the casing on the first stuffing horn only if the sensing means senses that a casing is not properly present on the second stuffing horn.

These and a variety of other objects, aspects and advantages to the invention are more fully described in a detailed description of the preferred embodiments of the invention, which follows.

BRIEF DESCRIPTION OF THE DRAWINGS

The preferred embodiment of the invention is to be described in relation to the accompanying drawing. The drawing comprises twelve figures, each identified as follows.

In the foregoing and following descriptions, terms of orientation such as "front" and "rear" are used. Such terms are intended for the convenience of the reader.

DETAILED DESCRIPTION OF THE PREFERRED EMBODIMENT

Figure 1:
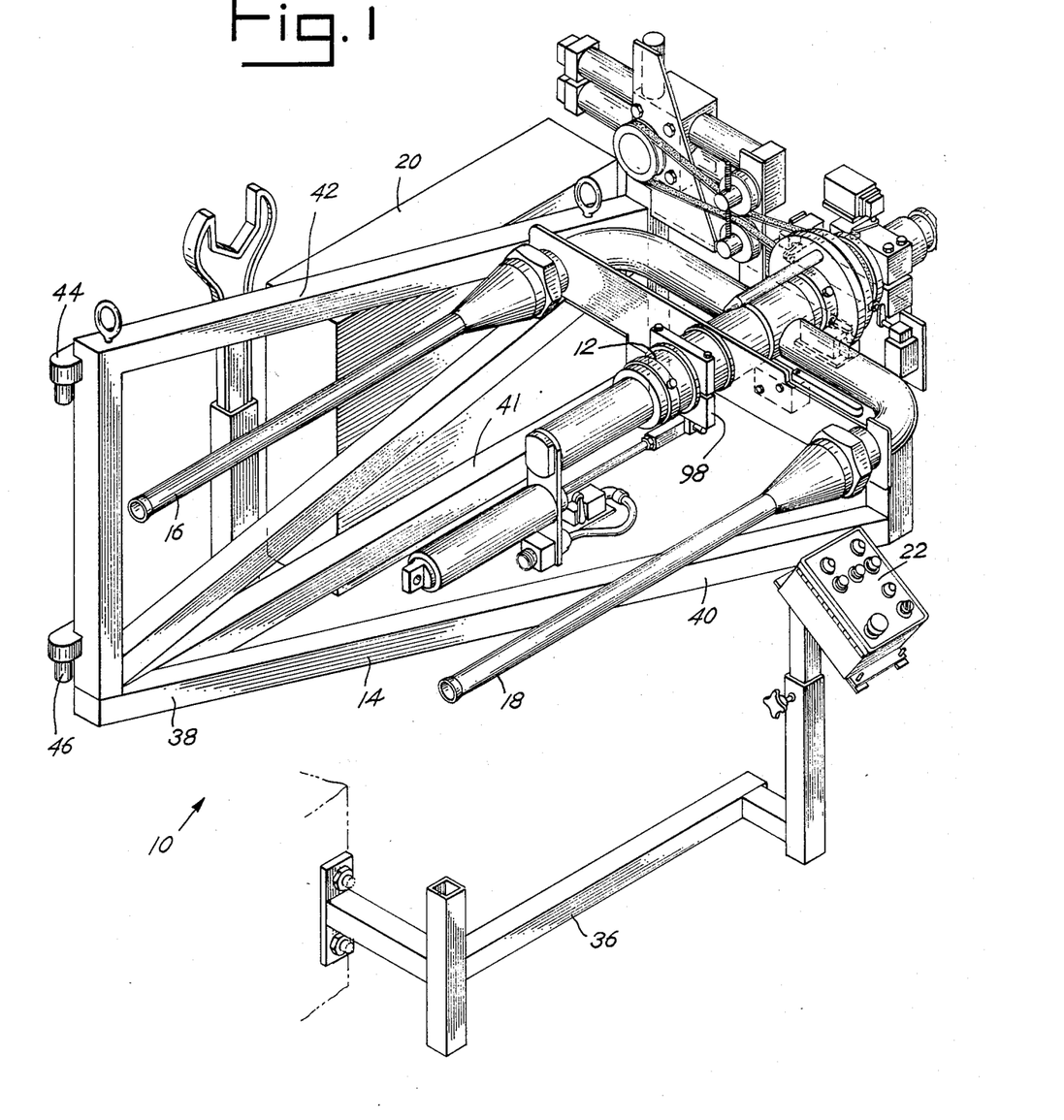
FIG. 1 is a perspective view of the preferred embodiment of the invention.

Referring to FIG. 1, the preferred embodiment of the present invention is, in mechanical and operational overview, a stuffing horn turret machine 10 including a rotatable and translatable turret 12 mounted upon a frame structure 14. The turret is adapted for removable, accurate mounting of a plurality of stuffing horns 16, 18 thereon. Electronic and pneumatic control elements in a compartment 20 and control panel 22 drive and control the machine 10, in association with various limiting, sensing and driving elements positioned about the machine 10.

Figure 2:
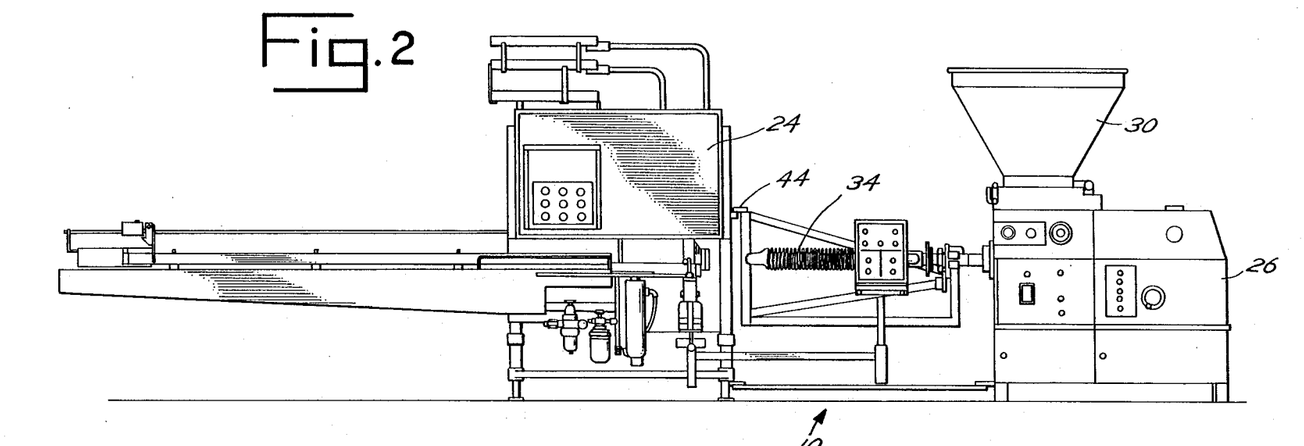
FIG. 2 is a side elevation view of the preferred embodiment of the invention as in use and operatively connected to a hopper apparatus and a clipper apparatus.
Figure 3:
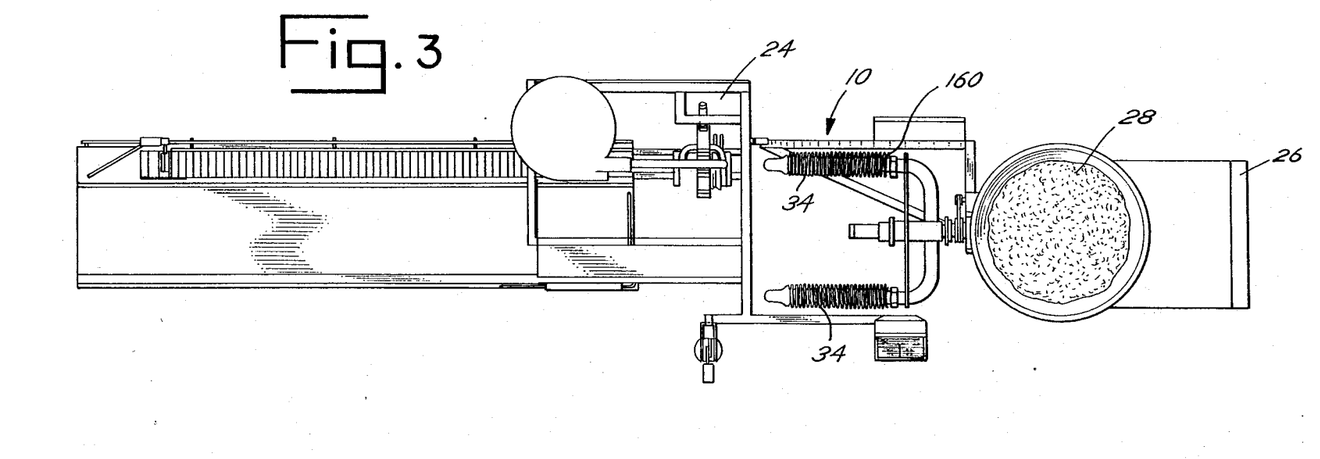
FIG. 3 is a plan view of the preferred embodiment as in use and as in FIG. 2.

Referring to FIGS. 2 and 3, the machine 10 is for use in operative association with a clipper 24 and a pumping apparatus 26. Stuffing material 28 enters the machine 10 from the pumping apparatus 26, upon entering hopper 30. The stuffing material 28 is propelled through a horn located in an active rotational and translational position, such as horn 16. The stuffing 28 exits the horn such as horn 16 into a casing such as casing 34 shirred on the horn. A casing brake in the clipper 24 controls the flow of casing relative to the flow of stuffing material. Various apparatus in the clipper 24 provides for the creation and movement of individual stuffed casing segments, i.e., sausages.

Referring to FIGS. 1–4, the preferred frame structure 14 is formed in a first frame segment 36 supporting the control panel 22 and a second frame segment 38 supporting the turret 12, horns 16, 18, the limiting, sensing and driving elements, and the compartment 20. As best shown in FIG. 1, the first segment 36 is bolted to the clipper 24.

Figure 4:
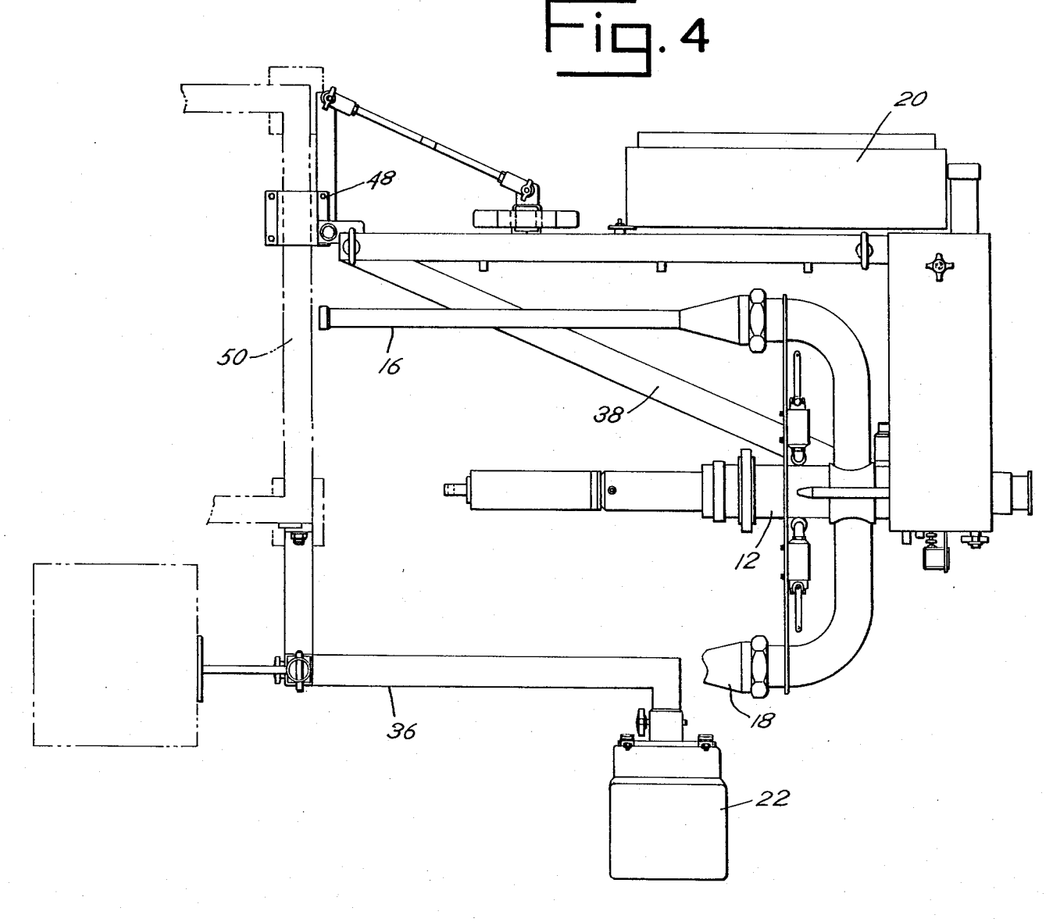
FIG. 4 is a plan view of the preferred embodiment.

Also as best shown in FIG. 1, the second frame segment 38 includes a plurality of rectangular, stainless steel tubing segments. These segments are welded into a complex shape including a horizontal frame triangle 40 and two vertical frame triangles 41, 42. At the forward end of the frame triangle 42, a pair of vertically spaced pivot pins 44, 46 provide for pivotable mounting of the major portion of the machine 10 upon the clipper 24. Cleaning, maintenance and accurate machine placement are facilitated, as the second frame segment 38 swings away to expose the turret 12 and associated elements to ready access. Such exposure occurs without movement of either the clipper 24 or the pumping apparatus 26. Referring to FIG. 4, the pins 44, 46 fit in mounts such as mount 48 upon the frame 50 of the clipper 24. The frame structure 14 may also include a releasable tie rod 52 to releasably lock the second frame segment 38 in operative position.

Figure 7:
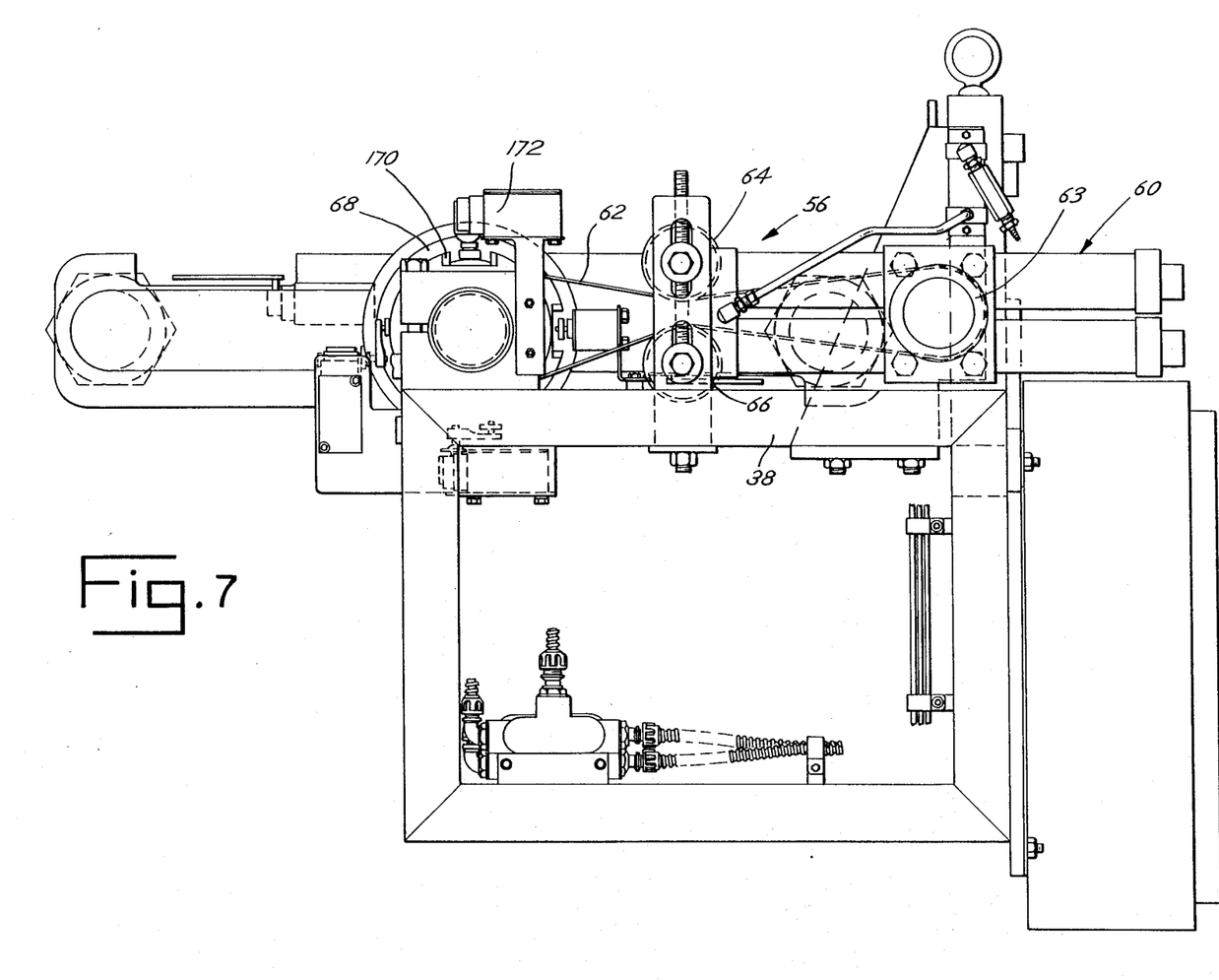
FIG. 7 is a rear elevation view of the preferred embodiment with the drive shield removed.
Figure 8:
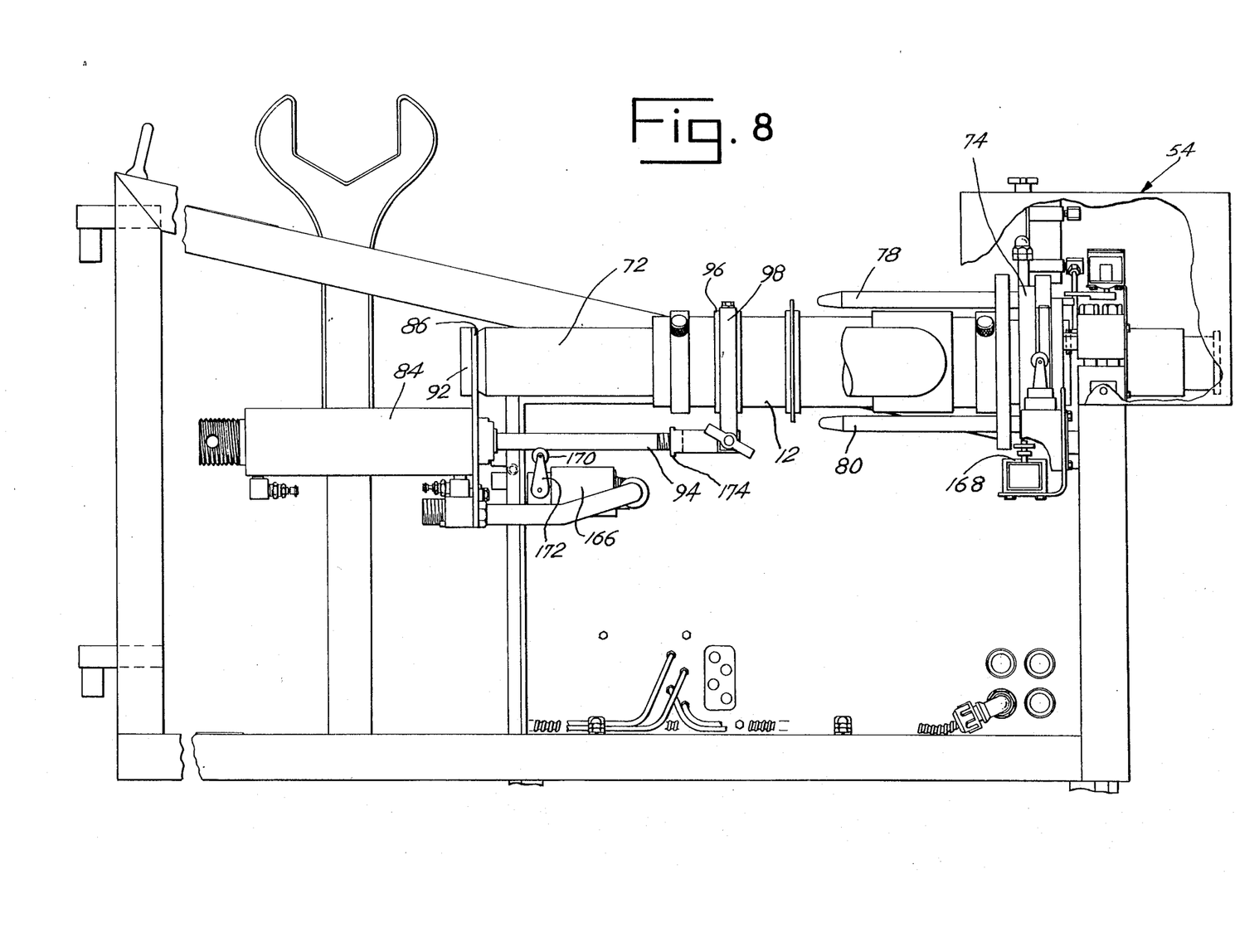
FIG. 8 is a side elevation view of the preferred embodiment with the horns and drive shield cut away to reveal detail.
Figure 12:
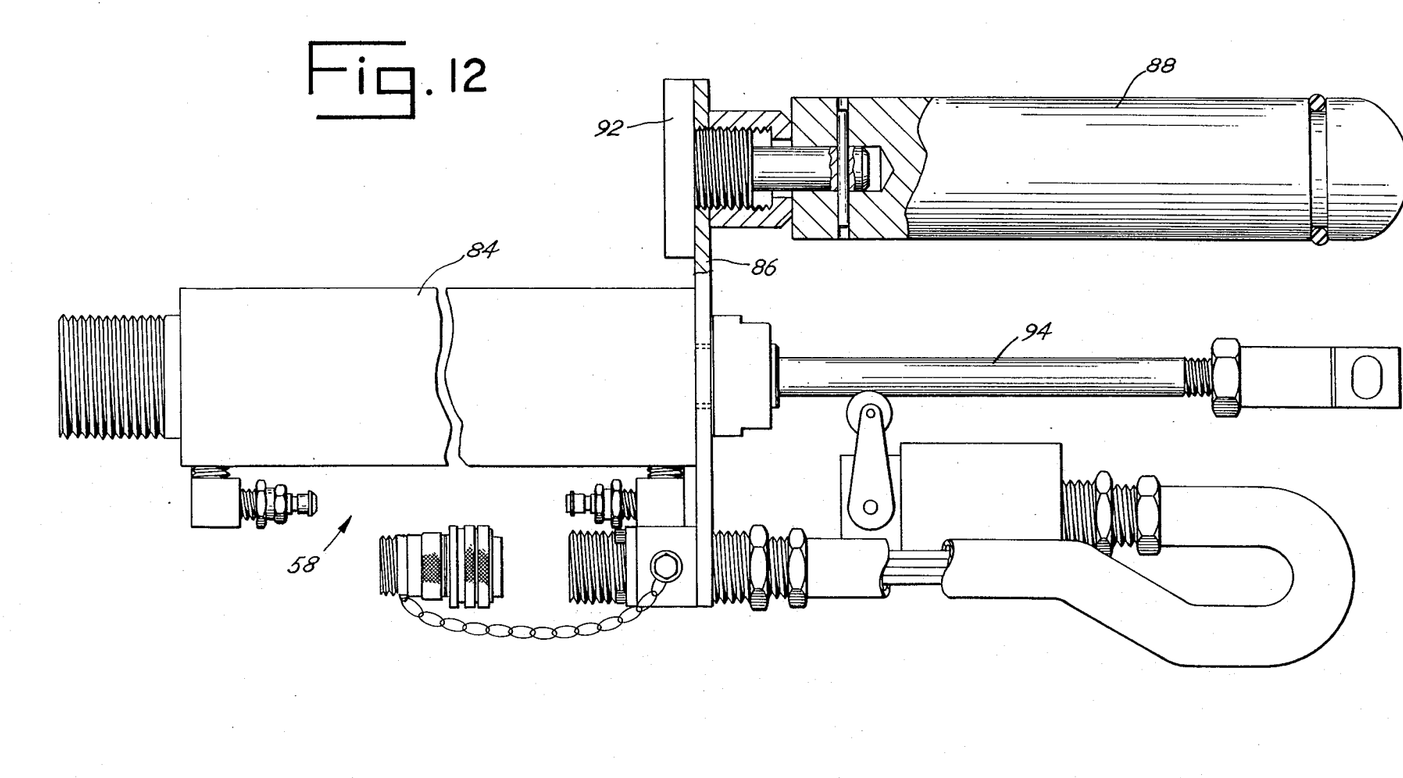
FIG. 12 is an elevation view of the cylinder assembly.

Comparing FIGS. 1, 4 and 5–8, removal of a drive shield 54 reveals a portion of the drive of the machine 10, which is a rotary, belt drive 56. Referring to FIGS. 1, 8 and 12, a second portion of the machine drive is a linear, cylinder drive 58.

Figures 5, 6:
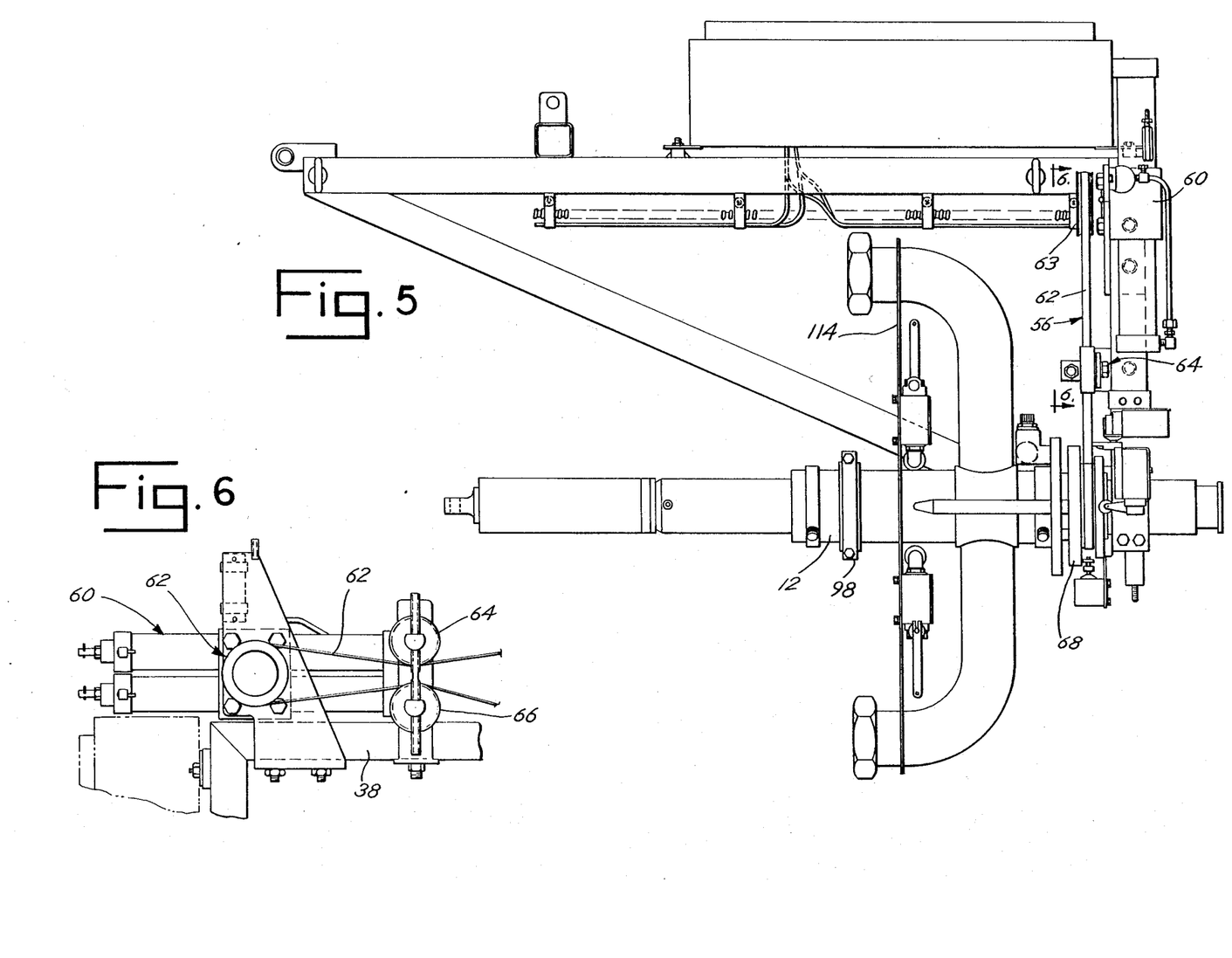
FIG. 5 is a plan view of the preferred embodiment; with stuffing horns, an operator control panel and a drive shield removed for improved illustration.
FIG. 6 is a front elevation view of a portion of the drive of the preferred embodiment taken along line 6—6 of FIG. 5.
Figure 10:
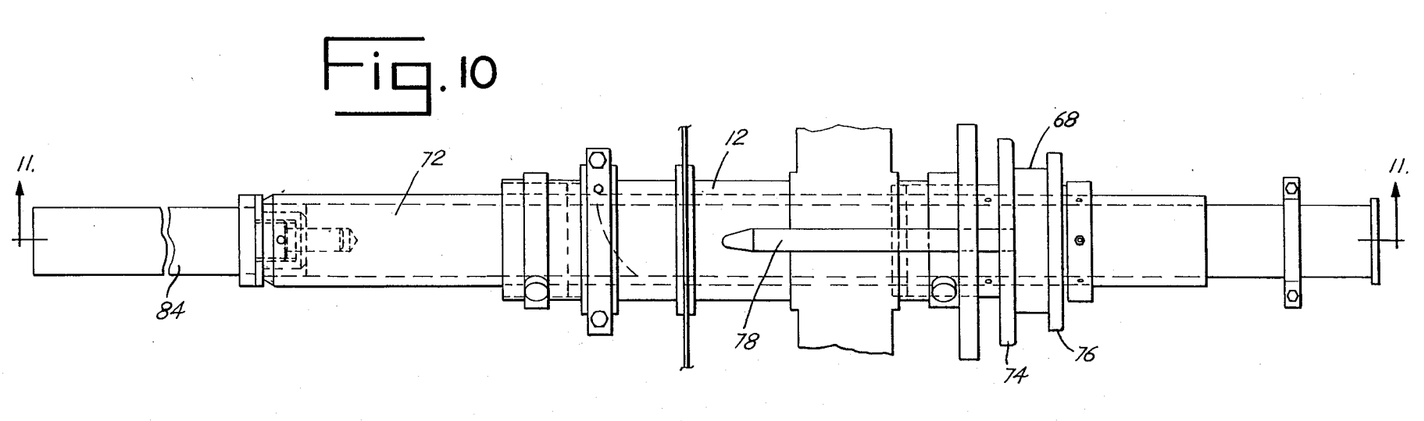
FIG. 10 is a plan view of the turret and cylinder assembly of the preferred embodiment.

As in FIGS. 5–7, the belt drive 56 includes a rotary pneumatic motor 60 mounted by a bracket to the frame segment 38. A belt 62 passes over a drive pulley 63 of the motor 60 through a pair of frame-mounted belt tighteners 64, 66 to a driven pulley 68. As in FIGS. 10–11, the pulley 68 is mounted about a bearing 70 and thereby about a fill tube 72.

The pulley 68 includes two flanges 74, 76. As in FIGS. 8 and 11, the forward flange 74 has a plurality of opposed longitudinal pins such as 78, 80 fixed thereon. The pins such as 78, 80 rotate with the pulley 68 as the pulley 68 is rotated by the motor 60.

The pins 78, 80 extend freely through a flange plate 82. The flange plate 82 is an integral part of the turret 12. The turret 12 is mounted about the fill tube 72, and is slidable longitudinally, or translationally, and also rotationally relative thereto. The turret 12 is slidable longitudinally toward and away from the drive pulley 68 and the belt drive 56. Translational movement is guided by the flange plate 82 and pins 78, 80. The turret is restricted in translation by contact of the flange plate 82 along the pins.

The turret 12 is rotatable under the action of the belt drive 56. Rotation of the driven pulley 68 causes rotation of the pins 78, 80 and thereby the turret 12.

The turret 12 is translatable under the action of the cylinder drive 58. As in FIGS. 11 and 12, a pneumatic cylinder 84 of the drive 58 is mounted by a flange 86 and an associated plug 88, releasable lock pin 90 and center pin 92 to the stationary fill tube 72. The movable rod 94 of the cylinder 84 is pinned to a turret yoke 96 which fits in a yoke holder 98. The yoke holder 98 is mounted about the turret 12, and provides a channel such that at all rotational positions of the turret 12, the translational position of the turret 12 is established by the position of he cylinder rod 94.

Figure 9:
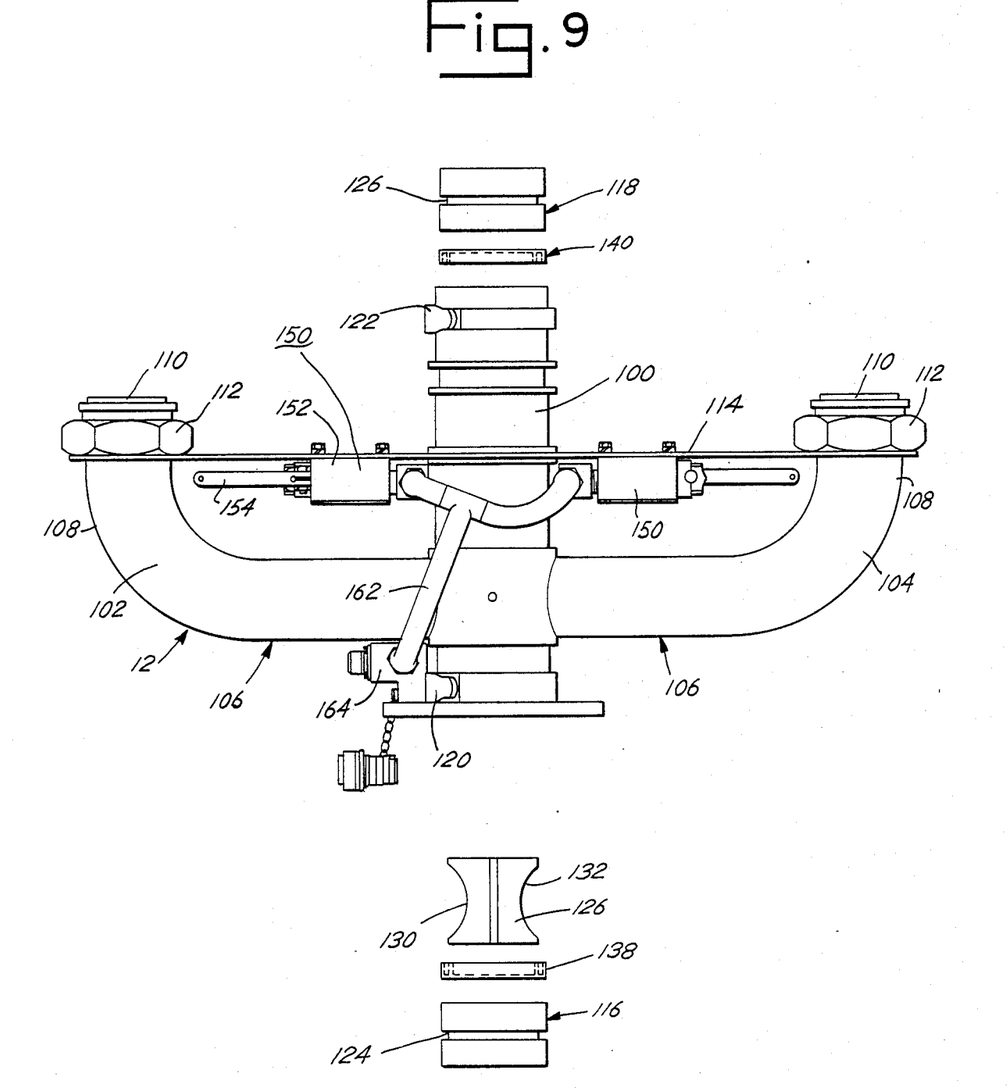
FIG. 9 is an exploded plan view of the turret assembly of the preferred embodiment.

Referring to FIG. 9, the turret 12 comprises a central tube 100 and two branch tubes 102, 104. The branch tubes 102, 104 each include a transverse run 106 projecting radially from the central tube 100. A longitudinal run 108 of each tube 102, 104 connects smoothly with the transverse run 106 and extends parallel to the central tube 100. The branch tubes 102, 104 are 180° opposite each other about the longitudinal axis of the central tube. Each longitudinal run 108 terminates in a stuffing horn fitting 110 with a captive horn retainer nut 112. The nut 112 never leaves the branch tube, and is thereby always ready to fasten to a horn. The nuts 112 cannot be misplaced.

Figure 15:
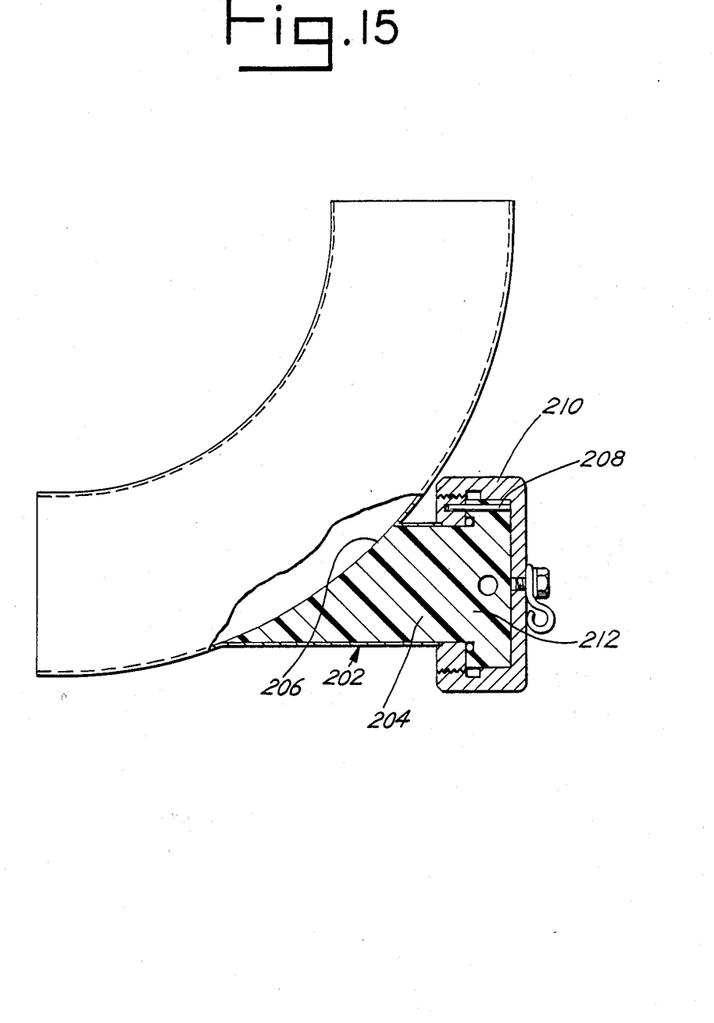
FIG. 15 is a cross-section of an alternative preferred branch tube of the preferred embodiment.

As shown in FIG. 15, an alternative preferred form of the branch tubes 102, 104 includes a capped inspection port 202. The port extends transversely in line with the transverse run 106. A Delrin plastic plug 204 fills the port 202 and has a surface 206 matched to the inner contour of the branch tube. The plug 204 is held in position by a dowel pin 208 fitted in a recess of the port 202, and a cap 210 secured to the port 202 over a head 212 of the plug 204. The port 202 provides ease of cleaning and complete visual inspection of the transverse runs 106.

A limit actuator mounting plate 114 extends transversely across the turret 12 from branch tube to branch tube behind the nuts 112. The plate 114 and associated elements are explained hereafter.

Internally, the turret 12 rides over two turret bearings 116, 118. The bearings 116, 118 are at opposite ends of the turret central tube 100. A pair of locator screws 120, 122 releasably fit within annular grooves 124, 146 in the bearings 116, 118 respectively. The screws 120, 122 properly locate the bearings 116, 118 within the tube 100. As in FIG. 11, the bearings 116, 118 ride about the stationary fill tube 72.

Figure 11:
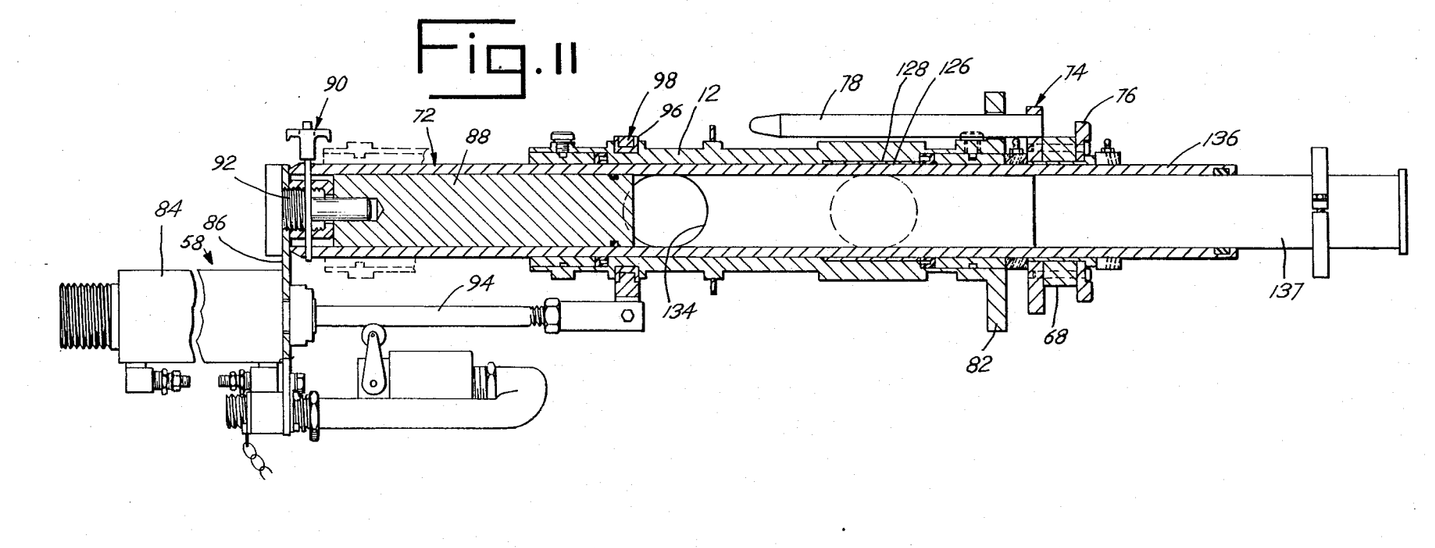
FIG. 11 is a cross section view of the turret and cylinder assembly taken along line 11—11 in FIG. 10.

A turret seal 126 fits within the tube 100, in a recess 128 of the tube 100, as in FIG. 11. The recess 128 is centered about the openings of the branch tubes into the center tube. The turret seal 126 itself includes two openings 130, 132.

The fill tube 72 includes a single lateral opening 134, and is hollow back to its receiving end 136. Alignment (not shown in FIG. 11) of a turret seal opening 130 or 132 and a branch tube opening with the single lateral opening 134 of the fill tube 72 allows stuffing material to enter a branch tube. The plug 88 includes a scooped internal surface (shown in dotted line in FIG. 10) adjacent the opening 134 to direct material smoothly into the proper branch tube.

A telescopic pipe 137 fits closely within the receiving end 136 of the fill tube 72. The pipe 137 is capable of being telescoped within the tube 72. i.e., the pipe 137 is slidably longitudinally therein. The portion of the pipe 137 external to the fill tube 72 may be adjusted, rapidly retracted and readily interchanged with another pipe for facile setup, cleanup and attachment to an interchanged pumping apparatus.

A pair of U-cups 138, 140 fit internally of the turret bearings 116, 118 respectively, within the turret 12. The U-cups form a hard edged U in cross section with the base of the U extending transversely of the turret 12. The U-cups 138, 140 are significant in that they provide a seal to prevent leakage from the turret 12. Also significantly, the turret bearings 116, 118 are removable for facile cleaning, maintenance and if necessary, replacement.

Figure 14:
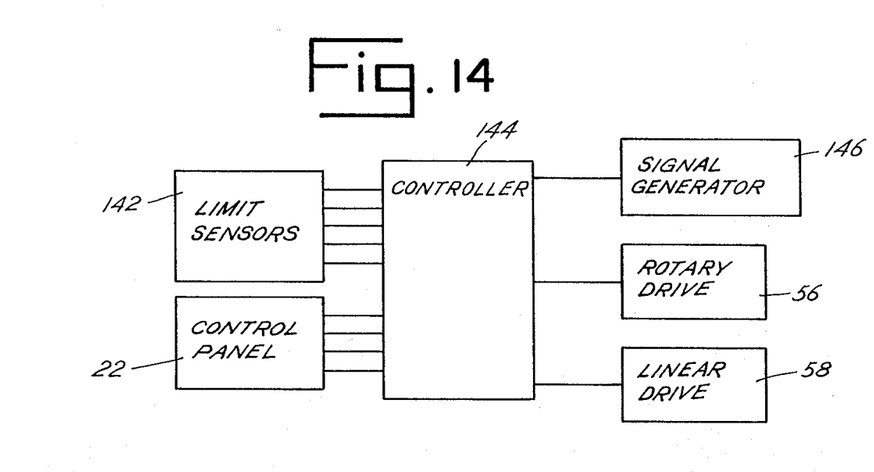
FIG. 14 is a diagrammatic view of the sensing, limiting and control elements of the preferred embodiment.

The machine frame, drives and turret are now described. Referring to FIG. 14, attention is directed to the limit sensors and controller generally designated 142 and 144, respectively, in FIG. 14. Attention is also directed to the signal generator 146.

The two drives 56, 58 of the machine 10 are pneumatic and are operatively connected to the controller 144 by such hoses and fittings as appropriate and within the skill of a person of ordinary skill in the art. Substantially all such hoses, fittings and the like, all of which interconnect the control panel 22, limit sensors 142, controller 144, signal generator 146, and drives 56, 58 are excluded from the accompanying drawing for clarity of illustration.

Figure 13:
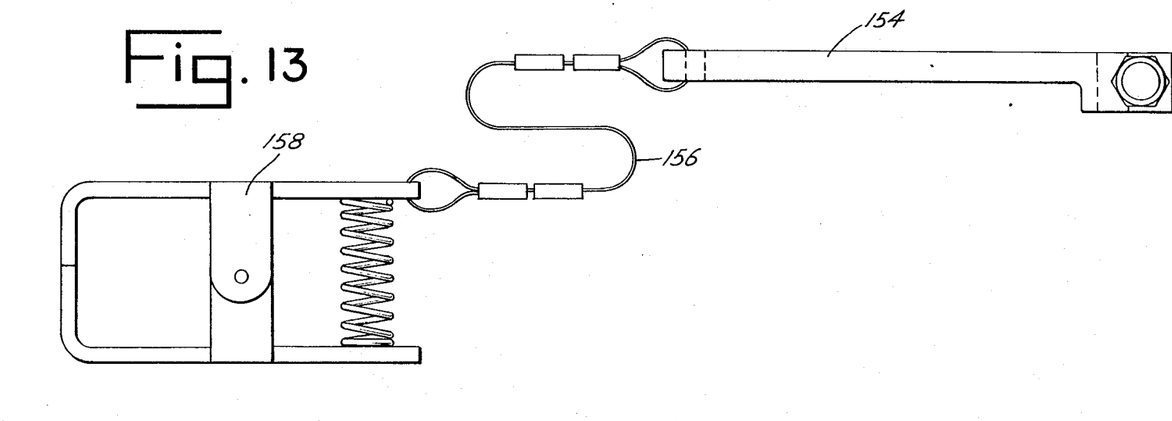
FIG. 13 is a detail view of a limit arm assembly of the preferred embodiment.

Referring to FIGS. 3, 9 and 13, primarily 9, the limit actuator or sensor mounting plate 114 has mounted thereon a casing end sensor mechanism 150 for each branch tube 102, 104. A mechanism 150 includes, as in FIG. 9, a pneumatic limit switch 152 and a triggering arm 154 mounted thereon. The arm 154 and switch 152 are oriented to trigger the switch 152 upon forward or longitudinal pivoting movement of the arm 154.

As in FIG. 13, each arm 154 has attached thereto a cable 156. A spring-loaded alligator type clip 158 is attached to the cable 156 opposite the arm 154. Upon loading of a casing 34 upon a horn such as horn 16 (the horn assumed to be on the turret 12), the clip 158 is manually clipped upon the end 160 of a casing 34. The extent of the cable 156 allows for such clipping without triggering the switch 152. As the casing end 160 approaches the clipper 24, the clip 158 moves longitudinally forward from the arm 154. Such movement as signifies the end of the casing reaching the clipper stretches the cable 156 and pulls the arm 154 to trigger the switch 152. Thus, the mechanisms 150 act as one possible form of sensing means for sensing movement of the end of casing from a stuffing horn. (The mechanisms 150 are pneumatically served by a branched run 162 of tubing on the turret 12, in turn served by a hose (not shown) releasably attached to a fitting 164.)

Referring to FIG. 8, pneumatic cylinder 84 has attached thereto by bracket 86 a pneumatic limit switch 166. Frame segment 38 also has attached thereto another pneumatic limit switch 168. The first linear switch 166 is triggered by movement of an arm 172 when an attached roller 170 is contacted by a flange 174 on the cylinder rod 94. The second linear switch is triggered by similar contact of the rod end upon a similar arm-mounted roller. The switches 166, 168 are mounted such that they are triggered upon the turret reaching an active or advanced translational position and an intermediate or retracted translational position. The retracted position is the position of the drawing. The advanced position is a position within which a horn is properly in place for use of casing thereon.

Referring to FIGS. 5 and 7, the flanges 74, 76 of the drive pulley 68 include notches such as notch 170 in the peripheries thereof. A plurality of pneumatic, rotary limit switches such as switch 172 cooperate with such notches to provide recognition of rotary positions of the pulley 68 and thereby the turret 12, when on the pins 78, 80. Thus, these rotary limit switches constitute one possible form of a limit means for sensing movement of the turret-attached horns to and from an active rotational position, the position of horn 16 in FIG. 1 and a passive or standby rotational position, the position of horn 18 in FIG. 1.

As may now be apparent, the controller 144, located in compartment 20, comprises in the preferred embodiment a plurality of operatively interconnected pneumatic logic elements. These logic elements are connected by hoses to the various limit switches located about the machine 10, and likewise connected to the drives 56, 58 and control panel 22. Upon activation through the control panel, the logic elements become active to receive inputs and cause the execution of responses. Activation is to include choice of an automatic mode of operation, if desired. Such choice is to occur only if a casing is properly present on the second horn. The choice is sensed and is the basis upon which the presence or absence of the casing on the second horn is sensed. Thus, the controller 144 constitutes one preferred form of a control means on the machine for causing the rotary drive 56 to rotate turret-mounted stuffing horns to and from the active and passive rotational positions after the limit mechanisms 150 sense movement of an end of a casing on a stuffing horn, for activating the signal generator 146 if a casing is not sensed as properly present on the second stuffing horn. The controller is also means for causing the linear drive 58 to advance and retract the turret 12 and thereby the stuffing horns 16, 18 from the active longitudinal position to the standby longitudinal position before causing the rotary drive 56 to rotate the stuffing horns.

The preferred embodiment is now described.

The preferred embodiment constitutes the best mode contemplated by the inventors of carrying out the invention.

The invention, and the manner and process of making and using it, have been described in full, clear, concise and exact terms to enable any person skilled in the art to make and use the same. Because the invention may be copied without the copying of the precise details of the preferred embodiment, the following claims particularly point out and distinctly claim the subject matter which the inventors regard as their invention and wish to protect.

We claim:

1. A turret machine for stuffing horns, the stuffing horns adapted to receive casings having ends, the machine comprising:
    a frame structure;
    a turret adapted to have mounted thereon at least two of the stuffing horns, the turret being rotatably mounted on the frame structure;
    drive means for rotating the turret and thereby the stuffing horns through at least one active rotational position and at least one standby rotational position;
    a limit means on the turret assembly for sensing movement of the ends of a casing on a first of the stuffing horns while the first stuffing horn is in active rotational position;
    control means on the machine for causing the drive means to rotate the first stuffing horn away from the active rotational position after the limit means senses movement of the end of the casing on the first stuffing horn and simultaneously causing the drive means to rotate the second stuffing horn to the active rotational position after the limit means senses movement of the end of the casing on the first stuffing horn; and
    sensing means for sensing the proper presence or absence of a casing on the second stuffing horn while the second stuffing horn is in the standby rotational position, the control means further being means for causing the drive means to rotate the second stuffing horn to the active rotational position only if the sensing means senses that a casing is properly present on the second stuffing horn.

2. A turret machine as in claim 1 further comprising signal means for signaling a human operator, the control means being operatively connected to the signal means and the control means further being means for activating the signal means after the limit means senses movement of the end of the casing on the first stuffing horn only if the sensing means senses that a casing is not properly present on the second stuffing horn.

3. A turret machine as in claim 1 in which the turret has two stuffing horn receptors, each adapted to have mounted thereon one stuffing horn, the stuffing horn receptors being 180° apart, and in which the drive means is drive means for rotating the turret and thereby the two stuffing horns through one active rotational position and one standby rotational position, the active rotational position and standby rotational position being 180° apart, the limit means being first limit means for sensing movement of the end of a casing on the first stuffing horn while the first stuffing horn is in the active rotational position and second limit means for sensing movement of the end of another casing on the second stuffing horn while the second stuffing horn is in the active rotational position, the control means being means for causing the drive means to (a) rotate either stuffing horn away from the active rotational position after a limit means senses movement of the end of a casing on either stuffing horn while in the active rotational position, and (b) simultaneously rotate the opposite stuffing horn from the standby rotational position to the active rotational position.

4. A turret machine as in claim 1 also for a clipper machine, the drive means of the turret machine being a first drive means, the turret machine having a second drive means for advancing and retracting the turret and thereby the stuffing horns toward and away from the clipper machine to and from an active longitudinal position and an intermediate longitudinal position, the control means being means for causing the second drive means to retract the turret and thereby the stuffing horns from the active longitudinal position to the intermediate longitudinal position after the limit means senses movement of the end of the casing on the stuffing horn and before causing the first drive means to rotate the stuffing horn.

5. The improved turret machine for stuffing horns as set forth in claim 1 wherein the limit means on the turret assembly for sensing movement of the end of a casing comprises a pivotal, limit switch arm mounted on the turret, said limit switch arm having a distal end connected by a flexible linkage to the end of the casing on a stuffing horn and responsive to tension on the linkage to thereby pivot the arm and effect the termination of flow of material through the stuffing horn into the casing.

6. A turret machine as in claim 1 in which the frame structure includes a means for pivotal mounting of the turret machine, whereby the turret machine is readily cleanable and maintainable without movement of any associated machinery.

7. A turret machine as in claim 1 in which the frame structure has an operative position and a means for releasably locking the frame structure in the operative position, and an inoperative position whereby the turret is exposed to ready access.

* * * * *